United States Patent [19]

Comerford et al.

[11] 4,244,681
[45] Jan. 13, 1981

[54] MAGNETIC FIBER OPTIC CASTING APPARATUS

[75] Inventors: Liam D. Comerford, Croton-on-Hudson; John D. Crow, Mohegan Lake; John S. Harper, Carmel, all of N.Y.

[73] Assignee: International Business Machines Corporation, Armonk, N.Y.

[21] Appl. No.: 108,777

[22] Filed: Dec. 31, 1979

[51] Int. Cl.³ .......................... B29C 6/00; B29D 3/02; B29D 11/00
[52] U.S. Cl. ...................................... 425/3; 425/123; 425/125; 425/808; 249/91; 249/83
[58] Field of Search .................. 425/3, 117, 123, 125; 249/96, 91, 83; 350/96.15, 96.2, 96.21, 96.22; 156/304

[56] References Cited

U.S. PATENT DOCUMENTS

| 2,770,013 | 11/1956 | Crooker | 425/3 |
|---|---|---|---|
| 3,020,608 | 2/1962 | Gelfand | 249/96 X |
| 3,036,356 | 5/1962 | Greulich | 249/96 X |
| 3,224,045 | 12/1965 | Hodge et al. | 425/3 |
| 3,404,422 | 10/1968 | Warner | 249/96 X |
| 3,439,732 | 4/1969 | Andreoli | 425/3 X |
| 3,769,395 | 10/1973 | Schmacher | 425/123 X |
| 3,993,283 | 11/1976 | Rubright | 249/96 |
| 4,174,367 | 11/1979 | Breher | 249/96 X |

*Primary Examiner*—J. Howard Flint, Jr.
*Attorney, Agent, or Firm*—Ronald L. Drumheller

[57] ABSTRACT

A mold having a vee-shaped groove receives an optical fiber end in butted relationship with either another fiber end or with a mold wall surface which is perpendicular to the vee-shaped groove. Field forces are generated which urge unattached and disposable fiber seating elements into the groove, the seating elements in turn pushing the optical fiber end(s) into the groove until the side surface of the optical fiber end(s) are in tangential contact with both sides of the vee-shaped groove. While the optical fiber end(s) are so positioned, casting liquid is introduced into the vee-shaped groove. The seating elements remain within the casting.

16 Claims, 5 Drawing Figures

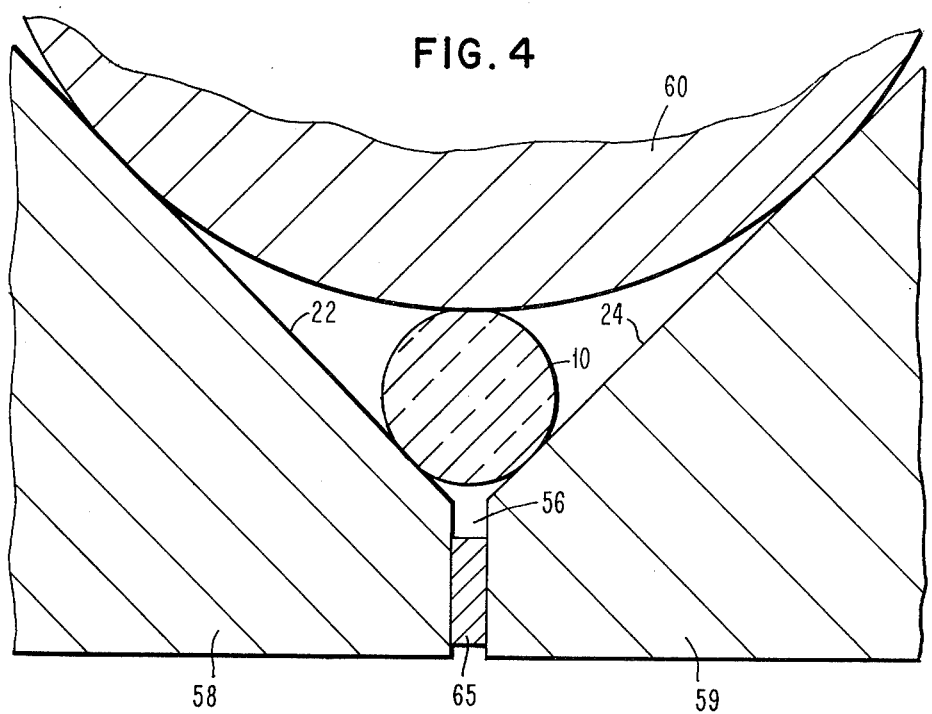
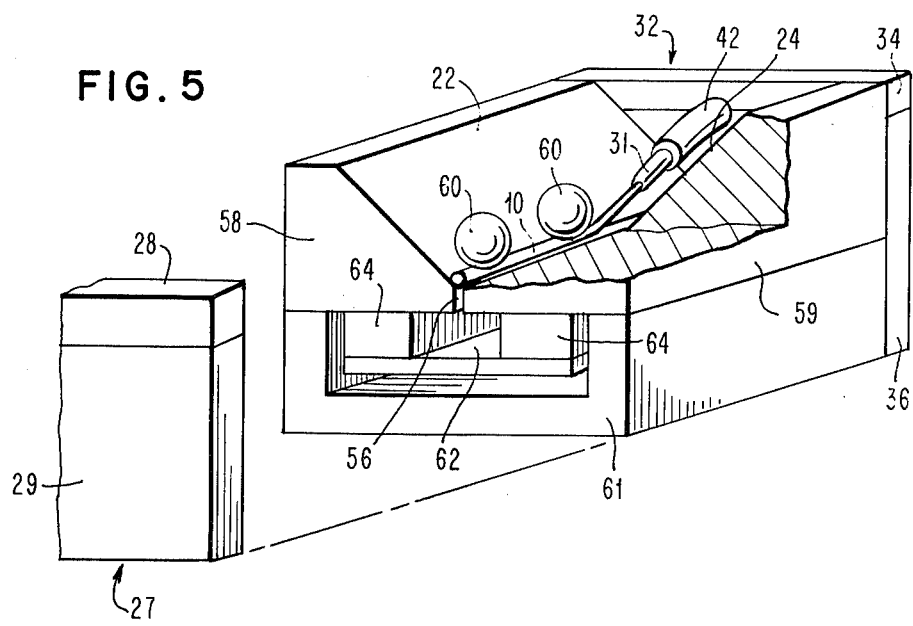

MAGNETIC FIBER OPTIC CASTING APPARATUS

DESCRIPTION

1. Technical Field

This invention relates to apparatus for coupling optical fibers and more particularly to apparatus and a method for accurately positioning one or more optical fibers within a casting mold.

2. Background of the Invention

Optically transparent glass and/or plastic fibers are being used advantageously in diverse areas of data communication and in other fields which require transfer of light energy between two locations. Such use has resulted in the need for convenient, reliable and efficient apparatus and techniques for coupling a pair of such fibers to each other. The difficulty in coupling optical fibers arises largely from their very small cross-section. In order to obtain highly efficient transfer of light energy from one optical fiber to another, the cores of the fibers must be positioned in axial alignment with each other and suitably close together. Since optical fiber cores typically have a diameter on the order of 50 $\mu$m, coupled optical fibers must be positioned with great precision. A further difficulty arises from the great fragility of such small hair-like fibers.

Optical fiber coupling apparatus and techniques found in the prior art are reviewed by C. Kleekamp and B. Metcalf in "Designer's Guide to Fiber Optics—Part 4," Electronic Design News, pages 51–62 Mar. 5, 1978).

The coupling apparatus and techniques of the prior art may be divided into three types: the fiber splice; the alignment adjustable connector; and the self-aligned connector. A fiber splice is generally made by bringing two fibers into butted alignment. One technique uses a common guiding structure. The two fibers and the guiding structure are then all permanently glued together in the aligned position with an index-matching adhesive. Guiding structures which have been used for splicing include V-shaped grooves, a square tube, and a bundle of three parallel rods which are 6.464 times larger in diameter than the fibers. A fiber splice may also be made by bringing two fiber ends into butt alignment in space and fusing the ends together. The primary disadvantage of these splice techniques can be that they are not generally convenient to install in the field.

Optical fiber connectors have the characteristic that a permanent coupling is not made. Connectors are taught, for example, in U.S. Pat. Nos. 3,936,143 and 4,019,806. The disadvantages of adjustable connectors are their complexity and the inherent need to make a cumbersome manual adjustment which requires alignment monitoring apparatus. The need to make a manual alignment and the difficulty in maintaining the alignment over the life of the connection makes this type of connector very difficult to use in the field.

Optical fiber connectors which are automatically aligned are, in principle, readily usable in the field. Most use cylinders and cones to automatically align and hold the fibers. One approach is to use a concentric sleeve and locking nuts to align and hold two ferrules. Each ferrule carries an optical fiber in concentric relationship therewith. A bundle of three or four rods within the ferrule have been used to center the fiber within the ferrule. Unfortunately, concentric sleeve connectors are complex and expensive.

It is an object of this invention to make optical fiber splices which have low optical energy loss without microscope alignment.

It is another object to splice optical fibers at low cost.

Still another object is to splice optical fibers in a simple and reliable manner.

A further object is to form plugs of predefined shape onto ends of optical fibers in such manner and with such precision that butt alignment of two plugs butt couples the fibers carried by the plugs.

It is also an object to form such plugs in simple manner and at low cost without any need for precision grinding or microscope alignment.

BRIEF DESCRIPTION OF THE DRAWINGS

FIG. 4 is a greatly enlarged view of the portion of FIG. 3 which is immediately adjacent to the optical fiber.

FIG. 5 is a partly cutaway perspective view of a casting apparatus in accordance with this invention being used to form an alignment plug on the end of an optical fiber.

DISCLOSURE OF INVENTION

These and other objects and features of the present invention are achieved by a mold having a vee-shaped groove for receiving an optical fiber end in butted relationship with either another fiber end or with a mold wall surface which is perpendicular to the vee-shaped groove. Field forces are generated which urge unattached and disposable fiber seating elements into the groove, the seating elements in turn pushing the optical fiber end(s) into the groove until the side surfaces of the optical fiber end(s) are in tangential contact with both sides of the vee-shaped groove. While the optical fiber end(s) are so positioned, casting liquid is introduced into the vee-shaped groove. The seating elements remain within the casting.

The disposable seating elements preferably are tiny spheres (ball bearings) which are magnetically attracted into the vee-shaped groove. Each side of the vee-shaped groove preferably is an individual magnetic pole piece. Two fiber ends may be butt aligned with each other in the same mold to form a permanent splice coupling. Also, individual plugs may be cast upon fiber ends with such great accuracy that when two plugs are butt aligned with each other in an alignment structure, the fiber ends carried by the plugs also become automatically butt aligned.

DETAILED DESCRIPTION OF THE INVENTION

Figure 1:
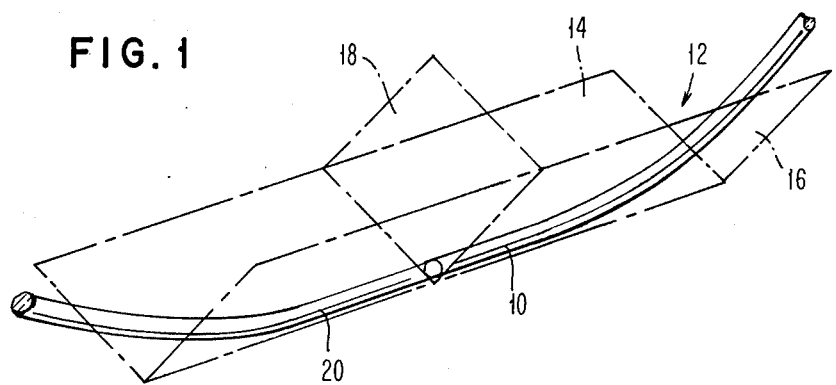
FIG. 1 illustrates the alignment principles of this invention.

FIG. 1 illustrates the alignment principles of this invention. An optical fiber end 10 fits within a vee-shaped groove 12 so that the side wall of the optical fiber end tangentially contacts both walls 14,16 of the vee-shaped groove. The fiber end may also be moved along the groove until it also simultaneously butts against a plane 18 which is perpendicular with the vee-shaped groove. Plane 18 may be a physical wall or it may instead be another optical fiber end 20, as shown in FIG. 1. It can be readily seen from FIG. 1 that two fibers become buttaligned within the vee-shaped groove so long as they both tangentially touch the groove walls 14,16 and the perpendicular plane 18. Two of us jointly with a third individual conceived the idea of casting a plug which has the shape of the corner 14, 16, 18 while a fiber end 10 is positioned as shown in FIG. 1, and then aligning two such plugs in an alignment frame. A patent application describing and claiming this connector has been filed concurrently herewith and is entitled "Self-aligned Plug Connector For Optical Fibers", Ser. No. 108,776, filed Dec. 31, 1979.

This invention may be used to cast the plugs required by the invention described in that copending application. It may also be used to permanently splice couple two optical fibers by casting a single vee-shaped plug with two fiber ends butt coupled together in the middle as shown in FIG. 1. In order to hold the fiber end(s) into contact with the walls of the vee-shaped groove, this invention has disposable seating elements which remain within the casting. The seating elements have a shape and size such that when they are urged into the groove, they will contact a fiber lying within the groove and push it into tangential contact with both side walls of the groove. Preferably, the seating elements have a tapered profile in the direction of the groove so that after the seating elements have been positioned, a fiber may be pushed into the groove and under the seating elements. Alternatively, the fiber or fibers may be inserted into the groove before the seating elements. It is preferred that the seating elements have a spherical shape, but other shapes can also be used, such as ellipsoids, cylinders, etc.

The seating elements are urged into the vee-shaped groove by generating a field which exerts force onto the seating elements. It is not practical to rely upon gravity alone to urge the seating elements into the groove since gravity does not generate enough seating force.

The field may either push the seating elements into the groove or it may pull the seating elements into the groove depending upon the particular design. An electrostatic field could be used in principle to generate the required force, but a magnetic field is preferred. As will be described in further detail hereinafter, a magnetic field which pulls the seating elements into the groove is convenient to produce with a vee-shaped groove and is preferred.

Best Mode For Carrying Out The Invention

Figure 2:
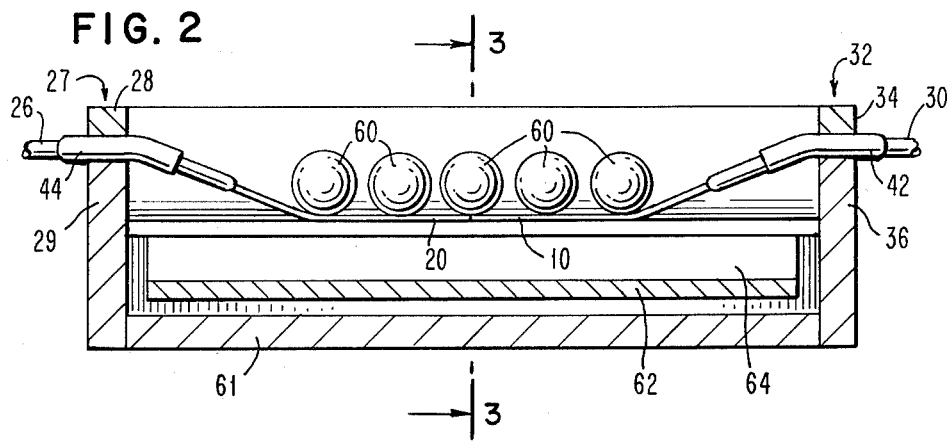
FIG. 2 is a longitudinal cross-sectional view of a casting apparatus in accordance with this invention being used to butt splice two optical fibers together.
Figure 3:
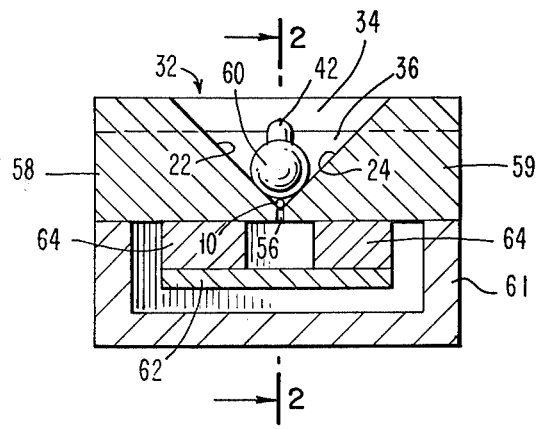
FIG. 3 is a lateral cross-sectional view of the same embodiment shown in FIG. 2.

FIGS. 2, 3, 4 and 5 illustrate a preferred mold structure for practicing this invention. FIG. 5 illustrates the use of the mold structure for casting a plug on the end of a single fiber. FIG. 2 illustrates the use of the mold structure for casting a plug which joins two fibers.

Surfaces 22,24 correspond with surfaces 14,16 of FIG. 1 and form side surfaces of a vee-shaped groove structure. Surfaces 22,24 are preferably perpendicular to each other but they may be oriented at either a larger or smaller angle so long as it is possible for a fiber end to be seated within the vee-shaped groove structure in tangential contact with surfaces 22 and 24. For making splice connections, at least, surfaces 22,24 need not be flat, and the walls may be curved in any direction rather than being straight as shown. Fiber cable 30 including a jacket 31 extends through a strain relief tubing 42 which extends through an end wall 32 of the mold. An unjacketed end 10 of fiber 30 cable lies so that the side surface of the fiber is in tangential contact with surfaces 22 and 24. End wall 32 has two parts 34,36 so that the fiber and strain relief tubing may be positioned with part 34 temporarily removed. Part 34 must also be removed to release a casting from the mold as will become more apparent.

The end surface of fiber end 10 is brought into contact with the end surface of another fiber end 20 which extends through another strain relief tubing 44 which extends through the other end wall 27 of the mold. An unjacketed end 20 of fiber cable 26 also lies so that its side surface is in tangential contact with surfaces 22 and 24. End wall 27 also has two parts 28,29 so that fiber 26 and tubing 44 may be positioned with part 28 temporarily removed. Part 28 must be removed to release a casting from the mold. The strain relief tubings may be bent as shown or straight and extend for a short distance outside of the mold to strain relieve the fibers. Shrink tubing (not shown) may be used to join the fiber with the strain relief tubing outside of the mold and would further relieve strain.

Gap 56 extends completely through the vee-shaped groove structure to divide it into separate pole pieces 58,59. Pole pieces 58,59 are composed of a magnetic material (e.g., tool steel) and are supported by a frame 61 and end walls 27,32 which are not composed of a magnetic material. Walls 27,32 and frame 61 may be made of glass or brass, for example.

Pole pieces 58,59 cooperate with permanent magnets 64 and iron shunt 62 to concentrate magnetic flux across gap 56 so as to attract spheres 60 (which are also composed of magnetic material) towards gap 56 and into the vee-shaped groove. Spheres 60 forceably seat the fiber ends 10,20 into contact with surfaces 22,24. The diameter of the spheres is preferably such that when they are in contact with one of the walls 22,24 and the seated fiber end 10 or 20, they are only very slightly spaced from the other of the surfaces 22,24. Spheres with a diameter of about 5.83 times the fiber radius are preferred when surfaces 22,24 are oriented perpendicular to each other. Spheres of this order of size are readily available as ball bearings. The width of gap 56 must obviously be sufficiently less than the diameter of the fiber to allow the side surface of the fiber end 10 to be tangent to the walls 22,24.

After the fibers are seated within the mold as shown, the mold is filled with a solidifiable liquid such as a transparent epoxy to form a casting. In order to remove the casting from the mold, parts 34,28 of the mold must be removed. The mold may be coated with mold release compound ahead of time or differential expansion may be used after casting to release the plug from the mold. The molding liquid preferably should have a viscosity such that it does not flow appreciably through the gap 56. It should be apparent, however, that gap 56 may contain a material 65 which is not magnetic (such as a dielectric material) so long as it does not touch a fiber. Such a material 65 may serve as a spacer for positioning pole pieces 58,59 and is shown in FIG. 4.

FIG. 5 illustrates the use of the mold structure for casting an alignment plug onto the end of a fiber. In this use the fiber end 10 is brought into contact with end wall 29 instead of another fiber. Preferably end wall 27 or part 29 thereof is made of a transparent material such as glass, so that the butting of the fiber end with the wall can be observed through the wall by using interferometric techniques, for example.

Having thus described our invention, what we claim as new, and desire to secure by Letters Patent is:

1. Apparatus for casting plugs into optical fiber ends, comprising:
   a mold having two side surfaces defining a vee-shaped groove for receiving at least one fiber end;
   at least one unattached fiber seating element, said at least one seating element having a size and shape such that when said at least one seating element is urged into said groove over a fiber end lying within said groove, said at least one seating element forces the side surface of said fiber end into tangential contact with both of said side surfaces of said groove;
   means for generating a field which urges said at least one seating element into said groove; and
   means for introducing a solidifiable liquid into said groove while at least one fiber end is held in tangential contact with both of said side surfaces of said groove by said at least one seating element,
   whereby said at least one fiber end and said at least one seating element may be thereby molded together into a plug.

2. Apparatus as defined in claim 1 wherein said two side surfaces of said groove are substantially flat.

3. Apparatus as defined in claim 2 wherein said two substantially flat side surfaces are oriented perpendicularly with respect to each other.

4. Apparatus as defined in claim 1 wherein said two side surfaces of said groove intersect each other.

5. Apparatus as defined in claim 1 wherein said at least one fiber seating element is a sphere.

6. Apparatus as defined in claim 1 wherein said field is a magnetic field.

7. Apparatus as defined in claim 6 wherein said magnetic field attracts said at least one seating element into said groove.

8. Apparatus as defined in claim 7 wherein said magnetic field is generated by at least one permanent magnet.

9. Apparatus as defined in claim 1 wherein said two side surfaces of said groove are surfaces of separate magnetic pole pieces.

10. Apparatus as defined in claim 9 wherein said pole pieces are spaced from each other at the bottom of said groove by a distance which is less than the diameter of said at least one fiber to be received by said apparatus.

11. Apparatus as defined in claim 1 wherein said groove may receive two fiber ends in butting relationship, whereby said two fiber ends may be thereby molded together into a permanent splice coupling.

12. Apparatus as defined in claim 11 wherein said at least one fiber seating element includes at least one fiber seating element for each of said two fiber ends, the side surface of each of said two fiber ends being individually held in tangential contact with both of said side surfaces of said groove when the seating elements are urged into said groove.

13. Apparatus as defined in claim 12 wherein the seating elements are spheres which are magnetically attracted into said groove.

14. Apparatus as defined in claim 1 wherein said groove has a flat end surface oriented perpendicularly with respect to the axis of said groove, said two side surfaces of said groove also being substantially flat.

15. Apparatus as defined in claim 14 wherein said groove may receive a single fiber end in butting relationship with said flat end surface of said groove.

16. Apparatus as defined in claim 15 wherein said single fiber end may be held in tangential contact with both of said two substantially flat side surfaces of said groove by at least one sphere which is magnetically attracted into said groove.

* * * * *